(12) United States Patent
Ghabra et al.

(10) Patent No.: US 10,645,596 B2
(45) Date of Patent: *May 5, 2020

(54) APPARATUS AND METHOD FOR DETECTING LOCATION OF WIRELESS DEVICE TO PREVENT RELAY ATTACK

(71) Applicant: Lear Corporation, Southfield, MI (US)

(72) Inventors: Riad Ghabra, Northville, MI (US); Keith A. Christenson, Canton, MI (US)

(73) Assignee: Lear Corporation, Southfield, MI (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/061,358

(22) Filed: Mar. 4, 2016

(65) Prior Publication Data

US 2016/0182548 A1 Jun. 23, 2016

Related U.S. Application Data

(63) Continuation of application No. 13/675,642, filed on Nov. 13, 2012, now Pat. No. 9,554,286.

(Continued)

(51) Int. Cl.
*H04W 24/00* (2009.01)
*H04L 29/06* (2006.01)
(Continued)

(52) U.S. Cl.
CPC ............ *H04W 24/00* (2013.01); *B60R 25/245* (2013.01); *G01S 5/10* (2013.01); *G01S 13/46* (2013.01);
(Continued)

(58) Field of Classification Search
CPC ....... H04W 24/00; H04W 4/02; H04W 24/10; B60R 25/245; G01S 5/10; G01S 13/46;
(Continued)

(56) References Cited

U.S. PATENT DOCUMENTS 5,723,911 A 3/1998 Glehr
6,087,987 A * 7/2000 Bachhuber .............. B60R 25/24
307/10.5

(Continued)

FOREIGN PATENT DOCUMENTS

CN 1981208 A 6/2007
DE 19957536 A1 6/2001
(Continued)

OTHER PUBLICATIONS

German Patent and Trademark Office, German Office Action for corresponding German Patent Application No. 10 2012 222 083.6 dated Jan. 20, 2016.

(Continued)

*Primary Examiner* — Mehmood B. Khan
(74) *Attorney, Agent, or Firm* — Brooks Kushman P.C.

(57) ABSTRACT

A passive entry passive start (PEPS) method for preventing relay attack includes detecting a distance of a wireless device to a vehicle based on a time of flight of an ultrawideband (UWB) signal between the wireless device and a base station at the vehicle. The method further includes enabling by the base station a function of the vehicle only when the distance of the wireless device to the vehicle is within a zone of the vehicle.

4 Claims, 3 Drawing Sheets

Related U.S. Application Data (60) Provisional application No. 61/566,339, filed on Dec. 2, 2011.

(51) Int. Cl.
  *G01S 5/10* (2006.01)
  *B60R 25/24* (2013.01)
  *G01S 13/46* (2006.01)
  *H04W 24/10* (2009.01)

(52) U.S. Cl.
  CPC .......... *H04L 63/107* (2013.01); *H04L 63/108* (2013.01); *H04L 63/1416* (2013.01); *H04W 24/10* (2013.01); *G01S 2013/466* (2013.01); *G07C 2209/63* (2013.01)

(58) Field of Classification Search
  CPC ............. G01S 2013/466; H04L 63/107; H04L 63/108; H04L 63/1416; G07C 2209/63
  See application file for complete search history.

(56) References Cited

U.S. PATENT DOCUMENTS

| | | | |
|---|---|---|---|
| 6,208,239 B1 | 3/2001 | Muller et al. | |
| 6,211,776 B1 | 4/2001 | Rohrl et al. | |
| 6,445,928 B1 | 9/2002 | Ruutu et al. | |
| 6,618,005 B2 | 9/2003 | Hannah et al. | |
| 6,707,378 B2 | 3/2004 | MacNeille et al. | |
| 6,747,599 B2 | 6/2004 | McEwan | |
| 6,760,591 B1 | 7/2004 | Klinger | |
| 6,784,826 B2 | 8/2004 | Kane et al. | |
| 6,803,882 B2 | 10/2004 | Hoetzel | |
| 6,937,136 B2 | 8/2005 | Greenwood et al. | |
| 6,965,296 B2 | 11/2005 | Kamlah | |
| 7,256,681 B1 | 8/2007 | Moody et al. | |
| 7,978,049 B2 | 7/2011 | Leitch | |
| 8,180,371 B1* | 5/2012 | Izdepski | H04W 64/006 455/456.1 |
| 8,319,605 B2 | 11/2012 | Hassan et al. | |
| 8,319,616 B2 | 11/2012 | Girard, III et al. | |
| 8,325,704 B1* | 12/2012 | Lemkin | H04J 3/0667 370/347 |
| 8,589,033 B2 | 11/2013 | Rafii et al. | |
| 9,384,491 B1* | 7/2016 | Briggs | H04W 4/02 |
| 2001/0033222 A1* | 10/2001 | Nowottnick | H04W 4/023 340/5.61 |
| 2002/0008615 A1 | 1/2002 | Heide et al. | |
| 2002/0024460 A1* | 2/2002 | Ghosh | B60R 25/24 342/43 |
| 2002/0155845 A1* | 10/2002 | Martorana | G01S 1/022 455/456.1 |
| 2003/0001776 A1 | 1/2003 | Hannah et al. | |
| 2003/0013146 A1* | 1/2003 | Werb | G01V 15/00 435/9 |
| 2003/0137453 A1 | 7/2003 | Hannah et al. | |
| 2003/0197640 A9 | 10/2003 | Johnson et al. | |
| 2004/0178883 A1 | 9/2004 | Haselsteiner et al. | |
| 2005/0046584 A1* | 3/2005 | Breed | E05F 15/43 340/13.31 |
| 2005/0049821 A1* | 3/2005 | Sahinoglu | G01S 5/12 702/150 |
| 2005/0228613 A1* | 10/2005 | Fullerton | G01S 5/0289 342/458 |
| 2006/0083406 A1* | 4/2006 | Ishimura | B60R 25/24 382/106 |
| 2006/0092874 A1* | 5/2006 | Agrawal | H04W 8/18 370/329 |
| 2006/0114100 A1 | 6/2006 | Ghabra et al. | |
| 2006/0145922 A1 | 7/2006 | Hill | |
| 2006/0197652 A1 | 9/2006 | Hild et al. | |
| 2006/0239285 A1* | 10/2006 | Nomura | H04J 3/0682 370/408 |
| 2007/0090965 A1 | 4/2007 | McCall | |
| 2007/0139200 A1* | 6/2007 | Yushkov | H04B 1/0007 340/572.1 |
| 2007/0241865 A1 | 10/2007 | Sato | |
| 2008/0061929 A1* | 3/2008 | Cromer | G06F 21/88 340/5.61 |
| 2008/0076373 A1 | 3/2008 | Takahashi et al. | |
| 2008/0204322 A1* | 8/2008 | Oswald | G01S 5/04 342/465 |
| 2008/0246603 A1* | 10/2008 | Mutou | G01S 3/40 340/539.13 |
| 2008/0252293 A1 | 10/2008 | Lagae et al. | |
| 2008/0259896 A1* | 10/2008 | Sahinoglu | G06K 7/10306 370/345 |
| 2008/0260019 A1* | 10/2008 | Aoyagi | H04B 1/7174 375/239 |
| 2008/0284564 A1* | 11/2008 | Leitch | B60R 25/24 340/5.61 |
| 2009/0051581 A1* | 2/2009 | Hatono | G01S 7/285 342/33 |
| 2009/0143923 A1* | 6/2009 | Breed | G08G 1/205 701/1 |
| 2010/0076622 A1* | 3/2010 | Dickerhoof | B60R 25/24 701/2 |
| 2010/0148925 A1* | 6/2010 | Kaplan | G06K 7/10306 340/10.1 |
| 2010/0171642 A1 | 7/2010 | Hassan et al. | |
| 2010/0305779 A1* | 12/2010 | Hassan | G01C 17/38 701/2 |
| 2010/0321154 A1* | 12/2010 | Ghabra | B60R 25/00 340/5.61 |
| 2011/0012780 A1* | 1/2011 | Alizadeh-Shabdiz | G01S 5/0226 342/357.23 |
| 2011/0032138 A1 | 2/2011 | Krapf et al. | |
| 2011/0148573 A1* | 6/2011 | Ghabra | B60R 25/245 340/5.61 |
| 2011/0259258 A1* | 10/2011 | DePiero | E02F 9/0858 116/200 |
| 2011/0267186 A1 | 11/2011 | Rao et al. | |
| 2012/0044093 A1 | 2/2012 | Pala | |
| 2012/0072109 A1* | 3/2012 | Waite | B60K 35/00 701/431 |
| 2012/0106543 A1* | 5/2012 | King | H04L 45/22 370/352 |
| 2012/0122484 A1* | 5/2012 | Marchenko | G01S 5/021 455/456.1 |
| 2012/0218128 A1 | 8/2012 | Tieman et al. | |
| 2012/0268242 A1* | 10/2012 | Tieman | B60R 25/24 340/5.61 |
| 2012/0274519 A1* | 11/2012 | Chakam | H01Q 1/3275 343/702 |
| 2013/0051255 A1* | 2/2013 | Estevez | H04W 64/00 370/252 |
| 2013/0069760 A1* | 3/2013 | Lickfelt | H04B 17/29 340/5.61 |
| 2013/0185072 A1 | 7/2013 | Huang et al. | |
| 2014/0285319 A1* | 9/2014 | Khan | G07C 9/00309 340/5.61 |
| 2014/0330449 A1 | 11/2014 | Oman et al. | |
| 2017/0096122 A1* | 4/2017 | Khan | G07C 9/00309 |

FOREIGN PATENT DOCUMENTS

| | | |
|---|---|---|
| DE | 102006043317 A1 | 3/2008 |
| DE | 102010042302 A1 | 5/2011 |
| JP | 2009155864 A | 7/2009 |
| WO | 0008280 A2 | 2/2000 |
| WO | 0100461 A1 | 1/2001 |
| WO | 0206766 A1 | 1/2002 |
| WO | 2005088561 A2 | 9/2005 |
| WO | 2005114593 A1 | 12/2005 |
| WO | 2006059296 A2 | 6/2006 |
| WO | 2007073969 A1 | 7/2007 |
| WO | 2008154747 A1 | 12/2008 |
| WO | 2009143415 A1 | 11/2009 |

(56) References Cited

FOREIGN PATENT DOCUMENTS

| WO | 2011006969 A1 | 1/2011 |
|----|---------------|--------|
| WO | 2011161176 A1 | 12/2011 |
| WO | 2011161177 A1 | 12/2011 |

OTHER PUBLICATIONS

Michael Tuechler, et al., Location accuracy of an UWB localization system in a multi-path environment, IEEE International Conference on Ultra-Wideband, Zurich, Sep. 2005.
Bucher et al., "A Synthesizable VHDL Model of the Exact Solution for Three-dimensional Hyperbolic Positioning System", VLSI Design, 2002, vol. 15 (2), pp. 507-520.
Reynolds, "A Phase Measurement Radio Positioning System for Indoor Use", Massachusetts Institute of Technology, Feb. 3, 1999, 66 pages.
German Office Action for corresponding Application No. 10 2012 222 083.6, dated Nov. 24, 2015, 4 pages.
Great Britain Search Report for corresponding Application No. GB1221597.6, dated May 28, 2013, 5 pages.
Chinese Office Action for corresponding Application No. 201210509040.X, dated Jun. 27, 2014, 9 pages.
German Office Action for corresponding Application No. 10 2012 222 083.6, dated Oct. 17, 2013, 5 pages.

\* cited by examiner

APPARATUS AND METHOD FOR DETECTING LOCATION OF WIRELESS DEVICE TO PREVENT RELAY ATTACK

CROSS-REFERENCE TO RELATED APPLICATIONS

This application is a continuation of U.S. application Ser. No. 13/675,642, filed Nov. 13, 2012, now U.S. Pat. No. 9,554,286, which claims the benefit of U.S. Provisional Application No. 61/566,339, filed Dec. 2, 2011; the disclosures of which are incorporated in their entirety by reference herein.

TECHNICAL FIELD

Embodiments of the present disclosure generally provide for an apparatus and method for detecting a location of a wireless device about a vehicle.

BACKGROUND

It is known to detect the location of a wireless device in relation to a vehicle. One implementation for detecting the location of the wireless device in relation to the vehicle is set forth directly below.

U.S. Patent Publication No. 2010/0076622 to Dickerhoof et al. provides a system for determining the location of a wireless device with respect to a vehicle. The system comprises a plurality of antennas positioned about the vehicle for receiving a wireless signal from the wireless device. The wireless signal corresponds to at least one of a command and status related to a predetermined vehicle operation. The system further comprises a controller operably coupled to each antenna. The controller is configured to generate a location signal indicative of the location of the wireless device based on the arrival time of the wireless signal at one or more antennas of the plurality of antennas and to control the operation of the predetermined vehicle operation based on the location signal.

SUMMARY

Embodiments disclosed herein generally provide for time of flight (TOF) measurements such that the distance between the wireless device and the vehicle is capable of being ascertained to determine the location of the wireless device in relation to a base station in the vehicle. Such a distance determination may provide the following for a passive entry passive start implementation: (i) relay attack prevention by determining distance between the wireless device and the vehicle; (ii) the ability to distinguish which side the user is standing (e.g., right/left determination) that may be required for an original equipment manufacturer (OEM) and Thatcham requirements; (iii) the ability to determine if the user is positioned about or proximate to a trunk of the vehicle; and (iv) the ability to determine the location of the wireless device either inside or outside of the vehicle cabin.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein.

Figure 1:
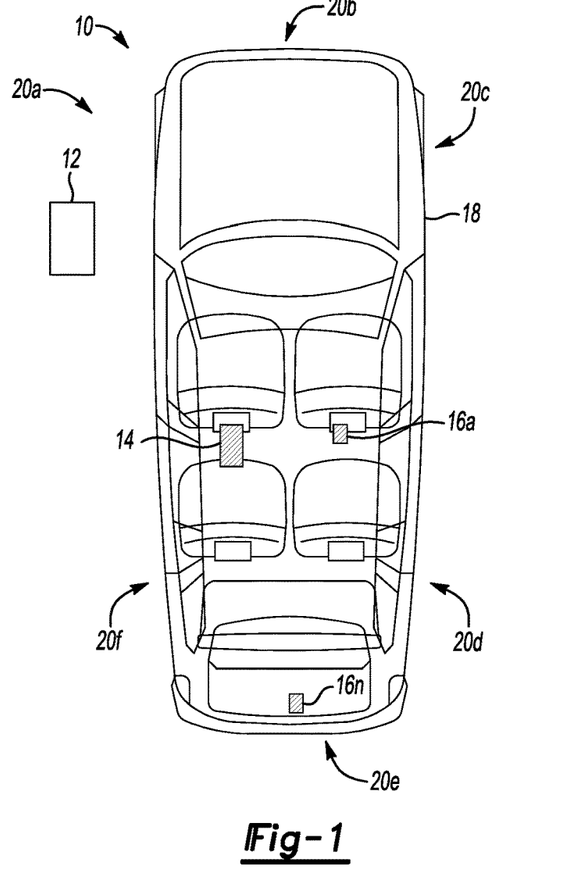
FIG. 1 depicts an apparatus for detecting a location of a wireless device in accordance to one embodiment.

FIG. 1 depicts an apparatus 10 for detecting a location of a wireless device 12 in accordance to one embodiment. Wireless device 12 may be implemented as a key fob or other suitable device that is used to gain entry into a vehicle 18. Apparatus 10 comprises a main base station 14 and at least two auxiliary base stations 16a-16n ("16") for detecting the location of wireless device 12 with respect to a vehicle 18. For example, main base station 14 and auxiliary base stations 16 each include a transmitter/receiver ("transceiver") for wirelessly transmitting/receiving signals to/from wireless device 12. The transmitter/receiver for each of wireless device 12, main base station 14, and auxiliary device 16 will be discussed in more detail in connection with FIGS. 2 and 3.

Main base station 14 generally includes additional circuitry to lock and unlock vehicle 18 in response to command signals as provided by wireless device 12. Apparatus 10 may perform a passive entry passive start (PEPS) function in which main base station 14 may unlock vehicle 18 in response to determining that wireless device 12 is positioned in a corresponding zone (or quadrant) 20a-20n (i.e., front driver side zone, vehicle front zone, front passenger side zone, rear passenger side zone, vehicle rear zone, and rear driver side zone, respectively) about vehicle 18. For example, zones 20 generally correspond to predetermined authorized locations about vehicle 18 (e.g., interior to and exterior to vehicle 18) such that if wireless device 12 is detected to be in one of such zones 20, then main base station 14 may automatically unlock the vehicle (or door) proximate to zone 20 in which wireless device 12 is detected to be within and enable the user to start the vehicle.

Apparatus 10 may utilize remote keyless operation in addition to the PEPS function. For example, main base station 14 may perform a desired operation (e.g., lock, unlock, lift gate release, remote start, etc.) with vehicle 18 in the event wireless device 12 transmits a command indicative of the desired operation while within authorized zone 20. In addition, apparatus 10 may be used to perform a car finder application.

In general, main base station 14, auxiliary base stations 16, and wireless device 12 engage in a series of signal exchanges with one another and utilize a time of flight (TOF) implementation to determine a distance of wireless device 12 from vehicle 18. Thereafter, main base station 14 and auxiliary base stations 16 may employ trilateration to locate the actual zone 20 wireless device 12 is positioned within. The use of trilateration enables main base station 12 the ability to locate where wireless device 12 is positioned horizontally from vehicle 18. This information (e.g., which zone 20 the wireless device 12 is positioned within) coupled with distance information as ascertained by utilizing TOF enables main base station 12 to locate with increased levels of accuracy the location of wireless device 12 in relation to vehicle 18. Apparatus 10 may be arranged to precisely determine the location of wireless device 12 about or within vehicle 18 as opposed to conventional systems in which perhaps only the transponder may be located at various sides of the vehicle with lesser degrees of accuracy.

For example, main base station 14 may determine that wireless device 12 is positioned at a distance of three meters away from vehicle 18 and that wireless device 12 is positioned in the zone 20a which corresponds to a driver side zone. While it is noted that the location of wireless device 12 may be ascertained via the TOF and trilateration, it is recognized that the aspects noted herein with respect to locating wireless device 12 may be applicable to other vehicle functions such as, but not limited to, tire pressure monitoring. These aspects and others will be discussed in more detail below. While utilizing the TOF, it is recognized that main base station 14 and auxiliary base stations 16 may be positioned at predetermined locations in vehicle 18 for transmitting and receiving signals to and from wireless device 12.

Figure 2:
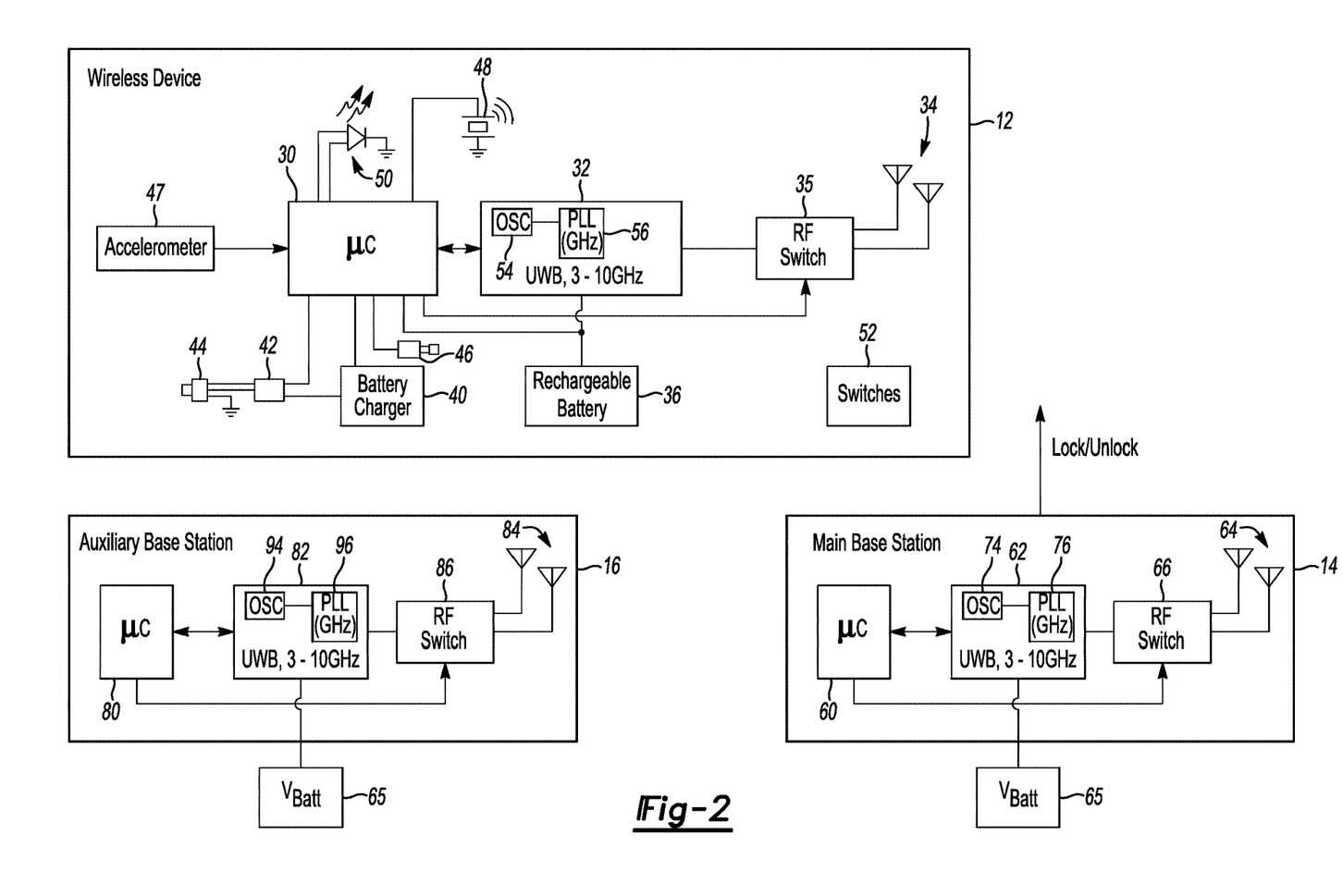
FIG. 2 depicts a detailed schematic view of the wireless device, the main base station and the auxiliary base station in accordance to one embodiment.

FIG. 2 depicts a detailed schematic view of wireless device 12, main base station 14, and an auxiliary base stations unit 16 in accordance to one embodiment. Wireless device 12 includes a microcontroller 30, a transmitter/receiver ("transceiver") 32, and at least one antenna 34. Microcontroller 30 is operably coupled to transceiver 32 and antenna 34 for transmitting and receiving signals to/from main base station 14 and auxiliary base stations 16. A radio frequency (RF) switch 35 is operably coupled to antennas 34 for coupling the same to transceiver 32. A multiple antenna 34 implementation may provide for antenna diversity which may aid with respect to radio frequency multi-paths. The use of RF switch 35 and multiple antennas is optional. For example, a single antenna 34 may be used for transmitting and receiving signal to and from wireless device 12.

A rechargeable battery 36 powers microcontroller 30 and transceiver 32. A battery charger circuit 40 receives power from a charger connector 42 that is operably coupled to an external power supply (not shown). Battery charger circuit 40 may condition the incoming power from the external power supply to ensure that it is suitable for storage on rechargeable battery 36. It is recognized that battery charger circuit 40 and battery 36 may wirelessly receive power from an external device for charging the same.

Battery charger 40 may indicate to microcontroller 30 when battery 36 is being recharged and/or the charge state of battery 36. A first lighting indicator 44 is positioned about charger connector 42 and is operably coupled to microcontroller 30 to provide charge status of battery 36 to a user. A vibrating motor 46 is operably coupled to microcontroller 30 and is arranged to provide a haptic feedback. An accelerometer 47 is operably coupled to microcontroller 30 for detecting the motion of wireless device 12. For example, wireless device 12 may be arranged to initiate the transmission of data in response to determining that it is moving. A piezo-sounder 48 is also operably coupled to microcontroller 30 and is arranged to provide an audio based feedback. A second lighting indicator 50 is operably coupled to microcontroller 30 and is arranged to provide a visual feedback. A plurality of switches 52 are positioned on wireless device 12, each for transmitting a command to vehicle 18 such that a desired operation is performed (e.g., lock, unlock, lift gate release, remote start, etc.).

Transceiver 32 is generally configured to operate at an operating frequency of between 3-10 GHz. In general, by operating transceiver 32 at an operating frequency of between 3-10 GHz, this condition may enable wireless device 12, and auxiliary base station 16 to determine a distance thereof with respect to vehicle 18 within a high degree of accuracy in the event wireless device 12 engages in communication with vehicle 18 to provide its distance from vehicle 18. The operating frequency aspect will be discussed in more detail below. Transceiver 32 generally includes an oscillator 54 and a phase locked loop (PLL) 56 for enabling transceiver 32 to operate at the frequency of between 3-10 GHz. By enabling transceiver 32 to operate at an operating frequency of between 3-10 GHz, such a condition also enables transceiver 32 to transmit and receive signals at an ultra-wide band (UWB) bandwidth of at least 500 MHz.

Main base station 14 generally includes a microcontroller 60, a transceiver 62, and at least one antenna 64. A RF switch 66 is operably coupled to microcontroller 60 and to antenna 64. RF switch 66 is operably coupled to antennas 64 for coupling the same to transceiver 62. A multiple antenna 64 implementation may provide for antenna diversity which may aid with respect to RF multi-paths. It is also contemplated that a single antenna 64 may be used for transmitting and receiving signal to and from wireless device 12 without the need for RF switch 66. Microcontroller 60 is operably coupled to transceiver 62 and antenna 64 for transmitting and receiving signals to/from wireless device 12 and auxiliary base station 16. A power source 65 in vehicle 18 powers microcontroller 60 and transceiver 62. Main base station 14 further includes circuitry (not shown) for performing locking/unlocking vehicle doors and/or a liftgate/trunk and for performing remote start operation.

Transceiver 62 is also generally configured to operate at the operating frequency of between 3-10 GHz. By operating transceiver 62 at an operating frequency of between 3-10 GHz, this condition may enable main base station 14 to determine the distance of wireless device 12 with respect to vehicle 18 within a high degree of accuracy when it engages in communication with wireless device 12. This will be discussed in more detail below. Transceiver 62 generally includes an oscillator 74 and a PLL 76 for enabling transceiver 62 to operate at the frequency of between 3-10 GHz. Transceiver 62 is also configured to transmit and receive signals at the UWB bandwidth of at least 500 MHz. By enabling transceiver 62 to operate at the operating frequency of between 3-10 GHz, such a condition also enables transceiver 62 to transmit and receive signals at the UWB range.

Auxiliary base station 16 generally includes a microcontroller 80, a transceiver 82, and at least one antenna 84. A RF switch 86 is operably coupled to microcontroller 60 and to antenna 64. RF switch 86 and multi-antenna 84 implementation is optional for the reasons noted above. Microcontroller 80 is operably coupled to transceiver 82 and antenna 84 for transmitting and receiving signals to/from wireless device 12 and main base station 14. Power source 65 in vehicle 18 powers microcontroller 80 and transceiver 82.

Transceiver 82 is also generally configured to operate at the operating frequency of between 3-10 GHz. By operating transceiver 82 at an operating frequency of between 3-10 GHz, this condition may enable auxiliary base station 16 to determine the distance of wireless device 12 with respect to vehicle 18 within a high degree of accuracy when it engages in communication with wireless device 12. This will be discussed in more detail below. Transceiver 82 generally includes an oscillator 94 and a PLL 96 for enabling transceiver 62 to operate at the frequency of between 3-10 GHz. Transceiver 82 is also configured to transmit and receive signals at the UWB bandwidth of at least 500 MHz. It is recognized that second auxiliary base station 16 is similar to auxiliary base station 16 as described above and includes similar components and provides similar functionality.

Wireless device 12, main base station 14, and auxiliary base stations 16 are each arranged to transmit and receive data within the UWB bandwidth of at least 500 MHz and this aspect may place large current consumption requirements on such devices. For example, by operating in the UWB bandwidth range, such a condition yields a large frequency spectrum (e.g., both low frequencies as well as high frequencies) and a high time resolution which improves ranging accuracy. Power consumption may not be an issue for main base station 14 and auxiliary base station 16 since such devices are powered from power source 65 in vehicle 18. However, this may be an issue for wireless device 12 since it is a portable device. Generally, portable devices are equipped with a standalone battery. In the event the standalone battery is implemented in connection with wireless device 12 that transmits/receives data in the UWB bandwidth range, the battery may be depleted rather quickly. To account for this condition, wireless device 12 includes rechargeable battery 36 and battery charger circuit 40, along with charger connector 42 (or wireless implementation) such that battery 36 can be recharged as needed to support the power demands used in connection with transmitting/receiving information in the UWB bandwidth range.

In general, the larger the operating frequency of transceivers 32, 62, and 82; the larger the bandwidth that such transceivers 32, 62, and 82 can transmit and receive information. Such a large bandwidth (i.e., in the UWB bandwidth) may improve noise immunity and improve signal propagation. This may also improve the accuracy in determining the distance of wireless device 12 since UWB bandwidth allows a more reliable signal transmission. As noted above, an operating frequency of 3-10 GHz enables transceivers 32, 62, and 82 to transmit and receive data in the UWB range. The utilization of the UWB bandwidth for wireless device 12, main base station 14, and auxiliary base stations 16 may provide for (i) the penetration of the transmitted signals to be received through obstacles (e.g., improved noise immunity), (ii) high ranging (or positioning) accuracy, (iii) high-speed data communications, and (iv) a low cost implementation. Due to the plurality of frequency components in the UWB spectrum, transmitted data may be received at wireless device 12, main base station 14, and auxiliary base station 16 more reliably when compared to data that is transmitted in connection with a narrow band implementation (e.g., carrier frequency based transmission at 315 MHz, etc.). For example, UWB based signals may have both good reflection and transmission properties due to the plurality of frequency components associated therewith. Some of the frequency components may transmit through various objects while others may reflect well off of objects. These conditions may increase the reliability in the overall reception of data at wireless device 12, main base station 14, and auxiliary base stations 16. Further, transmission in the UWB spectrum may provide for robust wireless performance against jamming. This may also provide for an anti-relay attack countermeasure and the proper resolution to measure within, for example, a few centimeters of resolution.

The implementation of UWB in wireless device 12, main base station 14, and auxiliary base station 16 is generally suitable for TOF applications.

Figure 3:
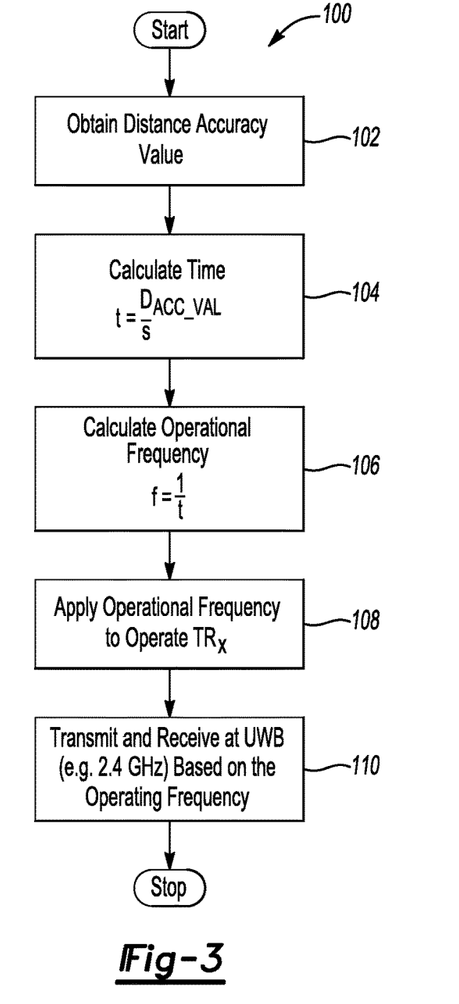
FIG. 3 depicts a method for determining an operating frequency of a transceiver on the wireless device, the main base station, and the auxiliary base station(s) in accordance to one embodiment.

FIG. 3 depicts a method 100 for determining the operating frequency of one or more transceivers 32, 62, and 82 on wireless device 12, main base station 14, and auxiliary base station 16, respectively, in accordance to one embodiment. As noted above, by operating transceiver 32, 62, and 82 at an operating frequency of between 3-10 GHz, this condition may enable main base station 14 and auxiliary base stations 16 to accurately determine the distance of wireless device 12 at a high resolution. Further, the specified operating frequency noted above also enables transceivers 32, 62, and 82 the ability to process time measurements with regard to TOF within a high resolution. The operations as set forth below generally indicate a correlation between the operating frequency and precision of the distance of wireless device 12 from vehicle 18. The precision of the distance determination may be a function of the operating frequency and the UWB bandwidth.

In general, main base station 14 engages in TOF measurements with wireless device 12 to provide a first distance $D_1$ with respect to the distance of wireless device 12 from main base station 14. In addition, auxiliary base station 16a engages in TOF measurements with wireless device 12 to provide a second distance $D_2$ with respect to the distance of wireless device 12 from the auxiliary base station. In addition, auxiliary base station 16n also engages in TOF measurements with wireless device 12 to provide a third distance $D_3$ with respect to the distance of wireless device 12 from each auxiliary base station 16n. At least three distance readings are needed such that trilateration is performed with the same to determine zone 20 in which wireless device 12 is located in (see FIG. 5). It is also contemplated that wireless device 12 may provide its own distance with respect to the vehicle using TOF measurements with main base station 14 or auxiliary base station 16.

In operation 102, a distance accuracy value $D_{ACC\_VAL}$ is provided which is generally indicative of a tolerance with respect to where wireless device 12 is located from vehicle 18. Wireless device 12, main base station 14, and auxiliary base stations 16 account for the distance accuracy value when such devices are arranged to provide a distance reading of wireless device 12.

Each distance reading as provided (e.g., the first distance $D_1$, the second distance $D_2$, and the third distance $D_3$) may be defined as:

$$f(D_1, D_2, D_3) = D_{actual} +/- D_{ACC\_VAL} \quad \text{(Eq. 1)}$$

where $D_{actual}$ is the actual distance of where wireless device 12 is actually located with respect to vehicle 18. As shown, $D_{ACC\_VAL}$ is generally indicative of a tolerance value. It is recognized that it may be difficult for apparatus 10 to provide the actual distance of wireless device 12 in relation to the vehicle due to some degree of error. It can be shown that $D_{ACC\_VAL}$ is directly proportional to the operating frequency at which wireless device 12, main base station 14, and auxiliary base station 16 operate. If a larger tolerance of $D_{ACC\_VAL}$ is desired or acceptable in terms of the distance of wireless device 12 from vehicle 18, then the operating frequency may be lower. If a smaller tolerance of $D_{ACC\_VAL}$ is required in terms of the distance of wireless device 12 from vehicle 18, then the operating frequency may be higher. The correlation between operating frequency and $D_{ACC\_VAL}$ is shown below.

For example, in operation 104, once the distance accuracy value has been obtained or provided (e.g., this may be a customer requirement in order to achieve a desired resolution in terms of the distance determination of wireless device 12), time (t) may be calculated by the following:

$$t = D_{ACC\_VAL}/s \quad \text{(Eq. 2)}$$

where s is the speed of light (i.e., a constant).

In operation 106, the operational frequency, $f_{op}$ is obtained by the following:

$$f_{op} = 1/t \quad \text{(Eq. 3)}$$

In operation 108, the operational frequency is then applied to transceivers 32, 62 and 82 on wireless device 12, main base station 14, and auxiliary base stations 16, respectively. Assuming $D_{ACC\_VAL}$ is ten cm, execution of Eq. 2 and Eq. 3 reveals that the operating frequency $f_{op}$ of wireless device 12, main base station 14, and auxiliary base stations 16 is 3.33 GHz.

In operation 110, wireless device 12, main base station 14, and auxiliary base stations 16 transmit and receive data at the operational frequency $f_{op}$ to and from one another in the UWB bandwidth range.

Figure 4:
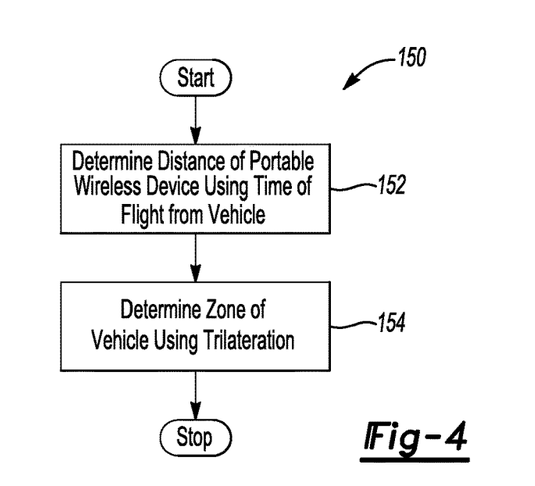
FIG. 4 depicts a method for detecting the location of the wireless device in accordance to one embodiment.

FIG. 4 depicts a method 150 for detecting the location of wireless device 12 in accordance to one embodiment.

In operation 152, apparatus 10 determines the distance of wireless device 12 using TOF measurements. TOF is known to be based on the time required for a wireless signal to travel from a first location to a second location, in which the time is generally indicative of the distance between the first location and the second location. This can be extended to apply to apparatus 10. For example, apparatus 10 may measure the time required for data (or information) to be transmitted from wireless device 12 and to one or more of main base station 14 and auxiliary base station 16 and determine the distance in which wireless device 12 is located from vehicle 18 based on the time measurements.

To begin the process of determining the location of wireless device 12 with respect to vehicle 18, wireless device 12 may transmit a polling signal to determine if it proximate to vehicle 18. In this case, wireless device 12 may periodically transmit the polling signal in response to detecting a motion thereof. Accelerometer 47 within wireless device 12 may transmit a motion signal to microcontroller 30 that indicates that wireless device 12 is in motion. Any one of main base station 14 and auxiliary base stations 16 may receive the polling signal and respond back to wireless device 12. For example, assuming main base station 14 receives the polling signal, main base station 14 may then transmit a first signal and include a first time stamp therein. The first signal is transmitted to wireless device 12. Wireless device 12 receives the first signal with the first time stamp and generates a second signal including a second time stamp corresponding to the time it received the first signal. Wireless device 12 transmits the second signal back to main base station 14. Main base station 14 may then determine a round trip time based on the first time stamp and on the second time stamp. The round trip time may correspond to the time measurement which is indicative of the distance between wireless device 12 and main base station 14. This exchange may be repeated any number of times such that any number of time measurements may be ascertained. Multiple measurements may improve the accuracy of the distance determination. Main base station 14 stores the first distance $D_1$ once determined in response to the time measurements.

After exchanging signals between wireless device 12 and main base station 14 to determine the first distance $D_1$, wireless device 12 and auxiliary base station 16a may engage in a similar exchange (e.g., insertion of time stamps) such that the second distance $D_2$ is obtained which corresponds to the distance between wireless device 12 and auxiliary base station 16a. Again, multiple signal exchanges with multiple time stamps may be used to improve the accuracy of the distance determination. Auxiliary base station 16a stores the second distance $D_2$ once determined in response to the time measurements.

After exchanging signals between wireless device 12 and auxiliary base station 16a to determine the second distance $D_2$, wireless device 12 and auxiliary base station 16n may engage in a similar exchange (e.g., insertion of time stamps) such that the third distance $D_3$ is obtained which corresponds to the distance between wireless device 12 and auxiliary base station 16n. Multiple signal exchanges with multiple time stamps may be used to improve the accuracy of the distance determination. Auxiliary base station 16n stores the third distance $D_3$ once determined.

It is to be noted that the above signal exchange between wireless device 12, main base station 14, and auxiliary base stations 16 may take into account delay times generally associated with electronics in wireless device 12 and in base stations 14, 16 for providing the time measurements.

Once auxiliary base stations 16a and 16n determine the second distance $D_2$ and the third distance $D_3$, each of auxiliary base stations 16a and 16n may wirelessly transmit such data to main base station 14. Main base station 14 uses the distances $D_1$, $D_2$, and $D_3$ to determine which zone 20 wireless device 12 is positioned in. This will be discussed in more detail below. The utilization of the operating frequency at between 3-10 GHz and the transmission/reception of information within the UWB bandwidth generally enables wireless device 12, main base station 14, and auxiliary base stations 16 to process the time measurement with a high degree of resolution so that main base station 14 and auxiliary base stations 16 each provide a corresponding distance (e.g., $D_1$, $D_2$, and $D_3$) within a high degree of resolution.

While it has been noted that main base station 14 may receive the distances $D_2$, $D_3$ from auxiliary base stations 16 and to determine the location of wireless device 12, it is contemplated that wireless device 12 itself may provide a distance reading in a similar manner to that stated above while engaging in TOF measurements with main base station 14 and/or auxiliary base stations 16 while also operating at the operating frequency corresponding to the distance accuracy value $D_{ACC\_VAL}$. In this case, wireless device 12 may provide a distance reading to main base station 14. Main base station 14 may then use the distance reading from wireless device 12 and those from the auxiliary base station(s) 16 to determine the location of wireless device 12.

Figure 5:
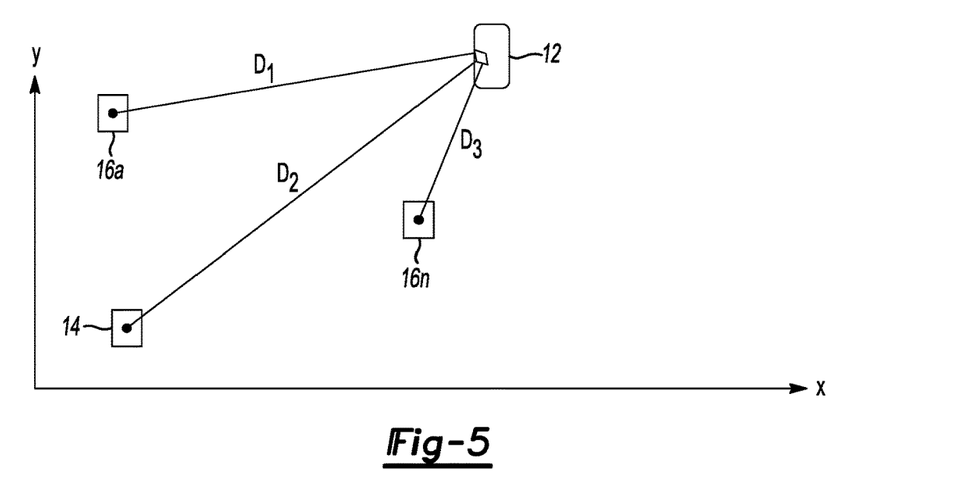
FIG. 5 depicts a first distance, a second distance, and a third distance of the wireless device from the vehicle in accordance to one embodiment.

FIG. 5 generally illustrates the distances (e.g., $D_1$, $D_2$, and $D_3$) as determined by the main base station 14, auxiliary base station 16*a*, and auxiliary base station 16*n*. It is recognized that at least three reference points (or three distance measurements (e.g., $D_1$, $D_2$, and $D_3$)) may be needed for the main base station 14 to ascertain which zone 20*a*-20*n* the wireless device is located in when main base station 14 performs trilateration.

In operation 154, main base station 14 employs trilateration to determine the zone 20*a*-20*n* in which wireless device 12 is positioned. As noted above, apparatus 10 may use the TOF implementation to ascertain the distance (e.g., $D_1$, $D_2$, and $D_3$) of wireless device 12 from vehicle 18. However, zone 20 in which wireless device 12 is positioned in may not be known even if the distances (e.g., $D_1$, $D_2$, and $D_3$) are known.

Generally, trilateration employs determining an absolute or relative location of points via measurement of distance by examining the geometry of circles, spheres, or triangles. An example of trilateration is set forth in "Intersection of two circles," Paul Bourke, April 1997 and in "Trilateration," Alan Kaminsky, Mar. 8, 2007. For example, main base station 14 may use the three distances $D_1$, $D_2$, and $D_3$ and utilize trilateration to find coordinates (e.g., zone) that wireless device 12 is positioned in. The coordinates of wireless device 12 may correspond to a point in the x, y, z axis. Once the final coordinates are ascertained, main base station 14 may perform a predetermined operation based on the final coordinates of wireless device 12. For example, main base station 14 may unlock a door or liftgate. In another example, main base station 14 may send a message over a communication bus to enable a remote start operation. Any number of vehicle operations may be performed once the final coordinates are ascertained.

It is also recognized that wireless device 12 may also perform trilateration instead of main base station 14. For example, as noted above, wireless device 12 may use the distance reading that it has calculated in addition to the distance readings (e.g., $D_1$, $D_2$, and $D_3$) from main base station 14, auxiliary base station 16*a*, and/or auxiliary base station 16*n* and perform the trilateration with these readings to determine zone 20 in which wireless device 12 is positioned. This information can be sent to main base station 14.

Figure 6:
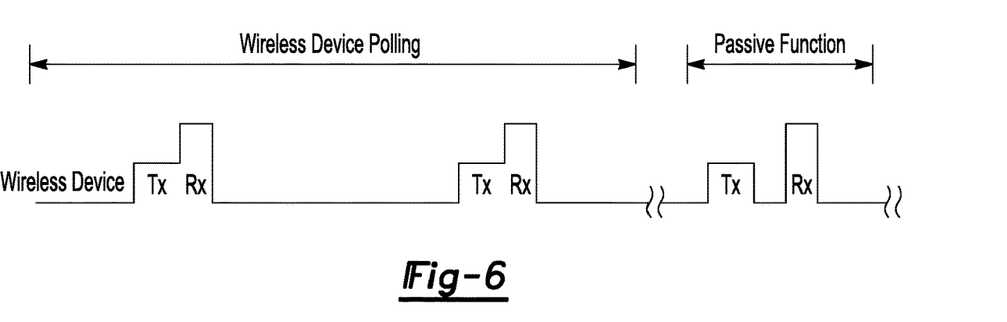
FIG. 6 depicts the manner in which the wireless device polls for a signal from the vehicle in accordance to one embodiment.

FIG. 6 depicts the manner in which wireless device 12 polls for a signal from one or more of main base station 14 and auxiliary base stations 16 in accordance to one embodiment.

Figure 7:
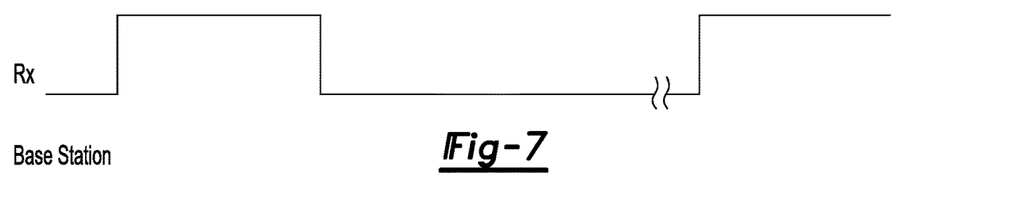
FIG. 7 depicts the manner in which the main base station monitors for the wireless device in accordance to one embodiment.

FIG. 7 depicts the manner in which main base station 14 and/or auxiliary base stations 16 poll for a signal from wireless device 12 in accordance to one embodiment.

Figure 8:
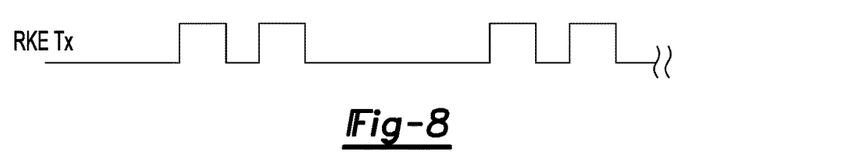
FIG. 8 depicts the manner in which the wireless device is actuated by a user and timing of the receiver in the vehicle in accordance to one embodiment.

FIG. 8 depicts the manner in which wireless device 12 is actuated by a user and the relationship to timing of main base station 14 and/or base stations 16 in vehicle 18 in accordance to one embodiment.

Figure 9:
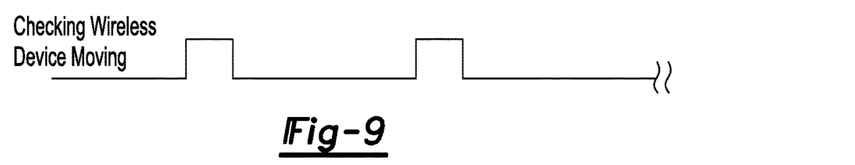
FIG. 9 depicts the wireless device polling internally to check for movement in accordance to one embodiment.

FIG. 9 depicts wireless device 12 polling internally to check for movement in accordance to one embodiment. As noted above, wireless device 12 includes accelerometer 47 for determining whether wireless device 12 is moving. This may serve as a trigger mechanism for wireless device 12 to initiate transmission of the polling signal as noted above in connection with FIG. 4 such that TOF measurements can be performed thereafter by main base station 14 and auxiliary base station 16.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for preventing relay attack on a passive entry passive start (PEPS) system of a vehicle, the PEPS system having a base station at the vehicle, the method comprising:
    transmitting, by a fob, a polling signal to the base station;
    in response to the base station receiving the polling signal from the fob, transmitting, by the base station, a first ultra-wideband (UWB) signal to the fob;
    transmitting, by the fob, a second ultra-wideband (UWB) signal to the base station in response to the first UWB signal, wherein an operating frequency of each UWB signal is between 3 GHz and 10 GHz and each UWB signal has a bandwidth of at least 500 MHz;
    determining, by the base station, a distance of the fob to the vehicle based on a round trip time of flight of the UWB signals between the fob and the base station; and
    detecting, by the base station, a relay attack of the PEPS system depending on the determined distance of the fob to the vehicle.

2. The method of claim 1 further comprising:
    transmitting the first UWB signal from the base station to the fob with a first time stamp;
    transmitting the second UWB signal from the fob to the base station with a second time stamp corresponding to the time the fob received the first UWB signal from the base station; and
    detecting the distance of the fob to the vehicle based on the round trip time of flight of the UWB signals as measured from the first time stamp and the second time stamp.

3. A passive entry passive start (PEPS) vehicle system configured to prevent relay attack, the system comprising:
    a fob; and
    a base station at a vehicle;
    wherein the fob is further configured to transmit a polling signal to the base station;
    wherein the base station is configured to transmit a first ultra-wideband (UWB) signal to the fob in response receiving the polling signal;
    wherein the fob is further configured to transmit a second UWB signal to the base station in response to receiving the first UWB signal;

wherein an operating frequency of each UWB signal is between 3 GHz and 10 GHz and each UWB signal has a bandwidth of at least 500 MHz;

wherein the base station is further configured to determine a distance of the fob to the vehicle based on a round trip time of flight of the UWB signals between the fob and the base station and detect a relay attack of the PEPS system depending on the determined distance of the fob to the vehicle.

4. The system of claim 3 wherein:

the base station is further configured to transmit the first UWB signal to the fob with a first time stamp;

the fob is configured to transmit the second UWB signal to the base station with a second time stamp corresponding to the time the fob received the first UWB signal from the base station; and the base station is further configured to detect the distance of the fob to the target device based on the round trip time of flight of the UWB signals as measured from the first time stamp and the second time stamp.

\* \* \* \* \*